US011127129B2

(12) United States Patent
Khosrowpour et al.

(10) Patent No.: US 11,127,129 B2
(45) Date of Patent: Sep. 21, 2021

(54) TECHNIQUES FOR IDENTIFYING HAZARDOUS SITE CONDITIONS IN GEO-LOCALIZED ENHANCED FLOOR PLANS (71) Applicant: The Joan and Irwin Jacobs Technion—Cornell Institute, New York, NY (US)

(72) Inventors: Ardalan Khosrowpour, New York, NY (US); John Mollis, Colts Neck, NJ (US)

(73) Assignee: The Joan and Irwin Jacobs Technion-Cornell Institute, New York, NY (US)

(*) Notice: Subject to any disclaimer, the term of this patent is extended or adjusted under 35 U.S.C. 154(b) by 0 days.

(21) Appl. No.: 16/523,385

(22) Filed: Jul. 26, 2019

(65) Prior Publication Data

US 2019/0385297 A1 Dec. 19, 2019

Related U.S. Application Data (63) Continuation-in-part of application No. 16/220,709, filed on Dec. 14, 2018, now Pat. No. 11,010,966.
(Continued)

(51) Int. Cl.
*G06K 9/00* (2006.01)
*G06K 9/46* (2006.01)
(Continued)

(52) U.S. Cl.
CPC ........ *G06T 7/0002* (2013.01); *G06K 9/00476* (2013.01); *G06K 9/46* (2013.01);
(Continued)

(58) Field of Classification Search
None
See application file for complete search history.

(56) References Cited

U.S. PATENT DOCUMENTS

| 8,026,929 B2 | 9/2011 | Naimark |
| 8,718,837 B2 * | 5/2014 | Wang .................. G06F 19/3418 701/2 |

(Continued)

FOREIGN PATENT DOCUMENTS

| CN | 106647585 A | 5/2017 |
| CN | 107993389 A | 5/2018 |
| CN | 108732979 A | 11/2018 |

OTHER PUBLICATIONS

The International Search Report and the Written Opinion of the International Searching Authority, dated Nov. 14, 2019, ISA/RU, Moscow, Russia.
(Continued)

*Primary Examiner* — Michael J Cobb
(74) *Attorney, Agent, or Firm* — M&B IP Analysts, LLC (57) ABSTRACT A system and method for identifying hazardous site conditions. The method includes training a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and identifying at least one hazardous site condition of a test enhanced floor plan by applying the classifier to a plurality of test features extracted from the test enhanced floor plan, wherein the classifier outputs at least one site condition classification when applied to the plurality of test features, wherein the at
(Continued)

least one hazardous site condition is identified based on the at least one site condition classification.

22 Claims, 8 Drawing Sheets

Related U.S. Application Data (60) Provisional application No. 62/711,069, filed on Jul. 27, 2018, provisional application No. 62/598,670, filed on Dec. 14, 2017.

(51) Int. Cl.
    *G06K 9/62*        (2006.01)
    *G06N 20/00*      (2019.01)
    *G06T 7/00*        (2017.01)
    *G06T 17/00*      (2006.01)

(52) U.S. Cl.
    CPC ........... *G06K 9/628* (2013.01); *G06K 9/6257* (2013.01); *G06N 20/00* (2019.01); *G06T 17/00* (2013.01); *G06T 2207/20081* (2013.01)

(56) References Cited

U.S. PATENT DOCUMENTS

| | | | | |
|---|---|---|---|---|
| 9,804,751 | B2 * | 10/2017 | Petrucci | G06T 11/203 |
| 10,026,218 | B1 | 7/2018 | Mertens et al. | |
| 2012/0239191 | A1 * | 9/2012 | Versteeg | G06N 3/004 |
| | | | | 700/246 |
| 2013/0155058 | A1 * | 6/2013 | Golparvar-Fard | G06T 17/00 |
| | | | | 345/419 |
| 2013/0195351 | A1 | 8/2013 | Hamada | |
| 2014/0002444 | A1 * | 1/2014 | Bennett | G06F 3/0304 |
| | | | | 345/419 |
| 2015/0363965 | A1 * | 12/2015 | Wells | G06F 1/1694 |
| | | | | 345/419 |
| 2016/0027051 | A1 * | 1/2016 | Gross | G06K 9/46 |
| | | | | 705/14.54 |
| 2016/0048934 | A1 * | 2/2016 | Gross | G06K 9/4642 |
| | | | | 705/313 |
| 2016/0092959 | A1 * | 3/2016 | Gross | G06Q 30/0276 |
| | | | | 705/26.62 |
| 2016/0260054 | A1 * | 9/2016 | High | G05D 1/0276 |
| 2018/0115672 | A1 | 4/2018 | Tomi et al. | |
| 2018/0276793 | A1 | 9/2018 | Kwon et al. | |
| 2018/0276885 | A1 | 9/2018 | Singh et al. | |
| 2019/0384969 | A1 | 12/2019 | Shimauchi et al. | |
| 2019/0385297 | A1 | 12/2019 | Khosrowpour et al. | |
| 2020/0074730 | A1 * | 3/2020 | Shloosh | G06T 17/05 |

OTHER PUBLICATIONS

Cabral, et al., "Piecewise Planar and Compact Floorplan Reconstruction from Images," 2014, IEEE Conference on Computer Vision and Pattern Recognition, pp. 628-235.
Cohen, et al., "Indoor-Outdoor 3D Reconstruction Alignment," 2016, Computer Vision—ECCV 2016 Lecture Notes in Computer Science, vol. 9907, pp. 285-300.
Furukawa, et al., "Reconstructing Building Interiors from Images," 2009, IEEE 12th International Conference on Computer Vision, pp. 80-87.
Han, et al. "Potential of Big Visual Data and Building Information Modeling for Construction Performance Analytics: An Exploratory Study," 2017, Automation in Construction, vol. 73, pp. 184-198.
McCann, "3D Reconstruction from Multiple Images," 2015, pp. 1-10, retrieved from https://web.stanford.edu/class/cs231a/prev_projects_215/cs231a-FinalReport-sgmccann.pdf.
Sadhu, et al., "Argus: Smartphone-enabled Human Cooperation via Multi-Agent Reinforcement Learning for Disaster Situational Awareness," 2016, IEEE International Conference on Autonomic Computing (ICAC), 2016, pp. 251-256.
Sung, et al., "A Fast 3D Scene Reconstructing Method Using Continuous Video," 2017, EURASIP Journal on Image and Video Processing, Taiwan, pp. 1-14.
Yang, et al., "Construction Performance Monitoring via Still Images, Time-lapse Photos, and Video Streams: Now, Tomorrow and Future," 2015, Advanced Engineering Informatics, vol. 29, China, pp. 211-224.
Gordon, et al., "What and Where: 3D Object Recognition with Accurate Pose," 2006, Toward Category-Level Object Recognition, Lecture Notes in Computer Science, vol. 4170, pp. 67-82, 2006.
International Search Report and Written Opinion of International Searching Authority for PCT/US2018/065712, ISA/RU, Moscow, Russia, dated May 6, 2019.
Mattyus et al., "Enhancing Road Maps by Parsing Aerial Images Around the World", IEEE Xplore, 2015, pp. 1689-1697.
Suveepattananont, et al., "Sparse 3D Model Reconstruction from Photographs", Project Blog: cis-497-3dreconstruction.blogspot.com, University of Pennsylvania, pp. 1-8.
A First Office Action for Canadian Patent Application No. 3,089,307, dated Dec. 24, 2020, CIPO, Canadian Intellectual Property Office, Quebec, Canada.
A Second Office Action for Canadian Patent Application No. 3,089,307, dated Feb. 25, 2021, CIPO, Canadian Intellectual Property Office, Quebec, Canada.

* cited by examiner

TECHNIQUES FOR IDENTIFYING HAZARDOUS SITE CONDITIONS IN GEO-LOCALIZED ENHANCED FLOOR PLANS

CROSS-REFERENCE TO RELATED APPLICATIONS

This application claims the benefit of U.S. Provisional Application No. 62/711,069 filed on Jul. 27, 2018. This application is also a continuation-in-part of U.S. patent application Ser. No. 16/220,709 filed on Dec. 14, 2018, now US PG Publication 2019/0385297, which claims the benefit of U.S. Provisional Application No. 62/598,670 filed on Dec. 14, 2017.

The contents of the above-referenced applications are hereby incorporated by reference.

TECHNICAL FIELD

The present disclosure relates generally to machine learning, and more specifically to identifying hazardous site conditions such as defects and safety hazards in enhanced floor plans using machine learning techniques.

BACKGROUND

During construction of a building, builders such as contractors, construction managers, insurers, construction lenders, and safety consultants are interested in monitoring development, ensuring the safety of workers, and assessing the risks workers are taking at all times. To this end, such builders regularly conduct walkthrough inspections (also known as walkthroughs) in which defects, safety hazards, and other hazardous site conditions that may serve as impediments to project completion may be identified. A typical walkthrough requires substantial attention from builders, and is therefore subject to human error that may result in failure to identify building deficiencies. Any deficiencies during construction must typically be addressed as soon as possible. As a result, failure to identify such deficiencies early in construction can result in significant expenditures to subsequently correct deficiencies, or may even result in harm to workers or building occupants.

Due to the need to ensure safety, walkthroughs are conducted on a regular basis such as, for example, daily, weekly, or monthly. Frequent walkthroughs may require significant devotion of resources due to the attention needed to completely identify all deficiencies. Due to these practical limitations, developers, insurers, and owners do not inspect and document site progress as frequently as would be ideal. Additionally, results of the walkthrough may need to be mapped to an appropriate floor plan manually by the person conducting the walkthrough, which requires significantly more time and may result in more errors.

To improve efficiency of site inspection, site inspectors may be provided with a reality capture walkthrough to be evaluated for hazardous site conditions rather than personally conducting walkthroughs. The site inspector virtually walks the site using mapped images and identifies hazardous site conditions shown in them. To further aid in making the inspections more efficient, some existing solutions have been developed to identify defects and hazardous site conditions in the images using computer imaging. However, both the manual and computer imaging solutions face challenges due to the low quality or incomplete nature of images that are often provided. Moreover, lack of having a sense of dimension and location adds to the incompleteness of data. As an example, when the images are provided by workers at the site, the images may provide an incomplete view of the site due to missing viewpoints and lack of measurement capabilities. As a result, the existing solutions may fail to accurately identify potentially hazardous site conditions.

Additionally, the existing computer imaging solutions analyze images with respect to a predetermined list of hazardous site conditions, and therefore cannot adapt to new types of hazardous site conditions without explicit programming by the operator of the computer imaging system. This can be problematic when, for example, new visual identifiers of potentially hazardous site conditions appear in the images or new safety regulations go into effect. Moreover, such solutions typically can only identify objects that could be of interest to site inspectors, but do not account for whether the circumstances surrounding the objects actually suggest potentially hazardous site conditions. As an example, some existing solutions identify people, hardhats, ladders, and other objects that may be of interest to a site inspector, but do not determine whether the identified objects demonstrate potentially hazardous site conditions. This stems from incomplete images, missing viewpoints, and lack of dimension and location information.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying hazardous site conditions. The method comprises: training a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and identifying at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification.

Certain embodiments disclosed herein also include a non-transitory computer readable medium having stored thereon causing a processing circuitry to execute a process, the process comprising: training a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and identifying at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification.

Certain embodiments disclosed herein also include a system for identifying hazardous site conditions. The system comprises: a processing circuitry; and a memory, the memory containing instructions that, when executed by the processing circuitry, configure the system to: train a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and identify at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification.

Certain embodiments disclosed herein also include a method for identifying hazardous site conditions. The method comprises: identifying at least one hazardous site condition of a test enhanced floor plan by applying a classifier to a plurality of test features extracted from the test enhanced floor plan, wherein the classifier is trained to classify site conditions using a labeled training set, wherein a labeled training set includes a plurality of training features and a plurality of training labels, wherein the plurality of training features are extracted from a plurality of training enhanced floor plans, wherein the plurality of training labels are a plurality of hazardous site condition identification labels, wherein the classifier outputs at least one site condition classification when applied to the plurality of test features, wherein the at least one hazardous site condition is identified based on the at least one site condition classification.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for identifying hazardous site conditions using machine learning based on features extracted from enhanced floor plans. A labeled training set is fed to a machine learning algorithm to train a classifier to identify hazardous site conditions. The training set includes features extracted from enhanced floor plans and hazard identification labels extracted from annotations associated with the enhanced floor plans. The training set may include visual features extracted from images of sites, environmental features extracted from other sensor data captured at the sites, or both. The classifier may be trained to classify sets of features (each set representing, for example, an object or condition on the site) into hazardous or non-hazardous, a particular type of hazard, a severity, a likelihood of injury, or a combination thereof.

After training of the classifier, hazardous site conditions may be identified using the classifier with respect to an enhanced floor plan. To this end, features including visual features, environmental features, or both, are extracted from the enhanced floor plan. Sets of the features are input to the classifier, and the classifier returns a classification indicating whether the set demonstrates a hazard or defect, a type of hazard or defect, a severity of each hazard, a likelihood of injury due to each hazard, or a combination thereof. The sets of features may be grouped with respect to, for example, locations (e.g., points or groups of points) on the enhanced floor plan. Based on the returned classification, hazardous site conditions are identified. A notification indicating locations of the identified hazardous site conditions, a type of each identified hazardous site condition, or both, may be sent to, for example, a user device of a site inspector.

Each enhanced floor plan may be created based on sensor data captured at a site. To this end, the creation of an enhanced floor plan may include generating a sparse 3D model including a cloud of 3D points based on the visual multimedia content and converting the sparse 3D model into a 2D site model using machine vision techniques. The 2D site model is geo-localized, mapped to, and superimposed on a 2D floor plan model. The enhanced floor plans may be interacted with via a graphical user interface, thereby allowing for addition of annotations by users. Labels to be input to the machine learning algorithm may be extracted from the annotations.

Figure 1:
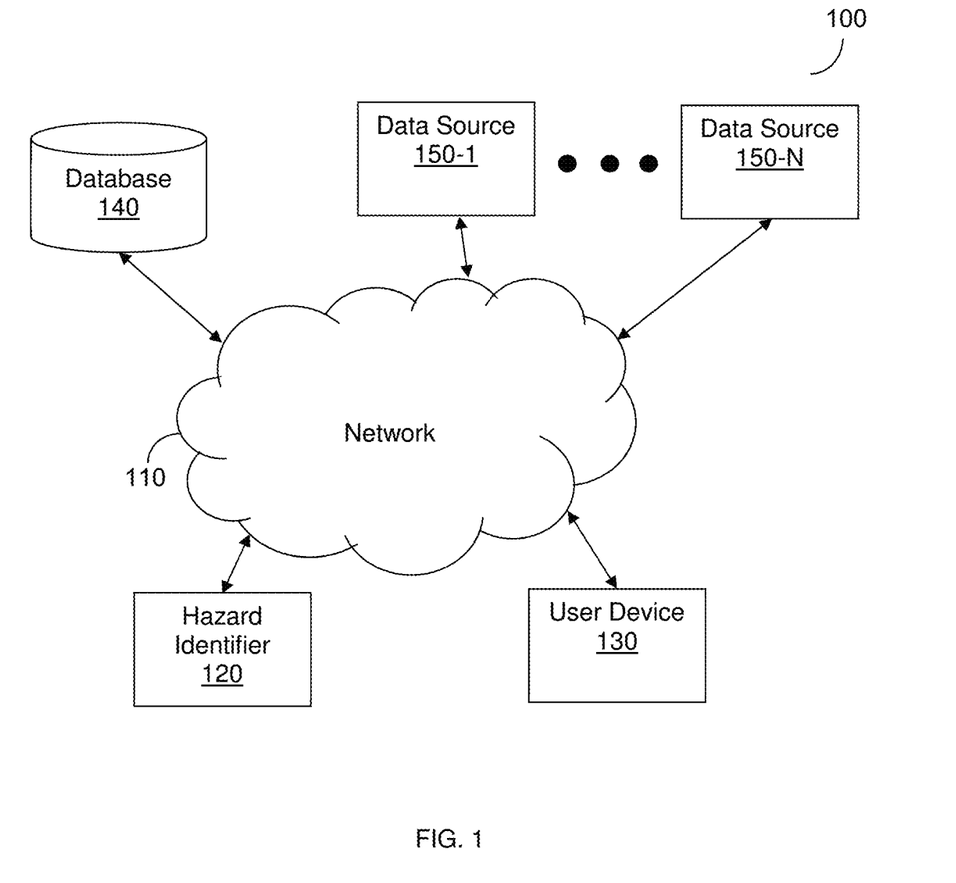
FIG. 1 is a network diagram utilized to describe the various disclosed embodiments.

FIG. 1 shows an example network diagram 100 utilized to describe the various disclosed embodiments. In the example network diagram 100, a hazard identifier 120, a user device 130, a database 140, and data sources 150-1 through 150-N (hereinafter referred to individually as a data source 150 and collectively as data sources 150, merely for simplicity purposes) are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The hazard identifier 120 typically includes a processing circuitry and a memory (e.g., the processing circuitry 410 and the memory 415, FIG. 4), and is configured to train a classifier and to identify hazardous site conditions in enhanced floor plans according to the embodiments disclosed herein. The hazardous site conditions include defects or other hazards that may impede progress of site work, present a danger to workers, both, and the like.

The user device 130 may be, but is not limited to, a personal computer, a laptop, a tablet computer, a smartphone, a wearable computing device, or any other device capable of capturing, storing, and sending unstructured data sets. The data sources 150 may store data including information related to hazards such as, for example, potential code or other standard violations. As an example, the data sources 150 may include servers of regulatory agencies such as the Occupational Safety and Health Administration (OSHA).

The database 140 may store enhanced floor plans. The enhanced floor plans may be created by, for example, the floor plan enhancer described further in the above-referenced U.S. patent application Ser. No. 16/220,709, assigned to the common assignee, the contents of which are hereby incorporated by reference. The enhanced floor plans are 2D site models superimposed on 2D floor plan models that may include visual multimedia content elements associated with points on the 2D site model, and environmental parameters associated with points on the 2D site model, or both.

The visual multimedia content may be captured during a walkthrough of a site and mapped to a floor plan during creation of the enhanced floor plan. In some implementations, the capturing of the visual multimedia content may be performed by a robot configured to perform a walkthrough of the site to ensure that sufficient views of images or video are captured. The walkthrough may be, but is not necessarily, along a predetermined walkthrough path. The environmental parameters may include, but are not limited to, dimension data and location data, and sensor signals captured by sensors deployed at the respective sites represented by the enhanced floor plans. The sensor signals may indicate, for example, noise level, volatile organic compound (VOC) level, temperature, humidity, smoke, and dust particles. The sensors may be deployed by, for example, being mounted on a robot conducting a walkthrough of the site, being transported by a person conducting a walkthrough, and the like.

The dimension data is a scaled 3d reconstruction sparse model. The location data identifies where objects are in the sparse model (e.g., with respect to the floor plan). The sparse 3D model is a 3D representation of the site having a point cloud including reference points representing portions of any objects or other visual features illustrated in the visual multimedia content.

The disclosed embodiments allow for identifying hazardous site conditions using enhanced floor plans created based on sensor data such as visual multimedia content and other sensor signals captured at sites. The enhanced floor plans may include the dimensions and distances between the objects within the scene using locations with respect to a floorplan. The enhanced floor plans indicate hazardous conditions at a scene, which may include conditions that are hazardous generally (e.g., a known slippery substance on the ground), or hazardous when certain conditions are met (e.g., when a known hazardous object is located within a threshold distance of another object). The known hazardous object or slippery substance may be, for example, a predetermined object or substance identified in visual multimedia content. As a non-limiting example, hazardous site conditions identified for fall protection include "Unprotected sides and edges." Each employee on a walking/working surface with an unprotected side or edge which is 6 feet (1.8 meters) or more above a lower level shall be protected from falling by the use of guardrail systems, safety net systems, or personal fall arrest systems. If a person is identified as being less than 6 feet from such an unprotected side or edge, the site condition is indicated on the enhanced floor plan as hazardous.

In some implementations, points on an enhanced floor plan may be associated with 3D visual representations of the respective point. As a non-limiting example, each point on the enhanced floor plan may be a portion of the site occupied during a walkthrough of the site that is associated with a 3D image captured from that portion of the site. A graphical user interface including the enhanced floor plan may allow users to interact with a point on the enhanced floor plan, thereby triggering a display of the 3D visual representation associated with the point.

Each enhanced floor plan may further include one or more temporal variations. Each temporal variation may demonstrate the state of the site at a different point in time. Accordingly, the enhanced floor plan may allow for viewing historical representations of the site over time (e.g., for the duration of construction). Each point of the enhanced floor plan may also be associated with historical versions of that point and their respective annotations. Historical data may be fed to the machine learning algorithm, which may result in a more accurate classifier due to learning of changes in conditions in a site that resulted in identification of hazardous site conditions by site inspectors. As a non-limiting example, when a first point on a site includes an image showing a clean floor with no associated annotations, and a subsequent point on the site includes an image showing a floor covered in a liquid substance with an associated annotation indicating a "housekeeping problem," the change in annotation may cause learning of the liquid substance as a potentially hazardous site condition.

A graphical user interface including the enhanced floor plan may further allow users to provide the annotations with respect to points in the 2D site model. The annotations may include, but are not limited to, markings on visual multimedia content, text, voice data, links to particular violations, or a combination thereof. The text or voice data may indicate, for example, whether a site condition shown in visual multimedia content is a hazardous site condition, a type of the hazardous site condition, a code or other standard violated by the hazardous site condition, or a combination thereof. As an example, the annotations may indicate that 29 CFR § 1910.305(a)(1)(i) has not been met (an OSHA violation) when an image, 3D data, and other data collected through various sensors of the point do not show effective bonding for a grounding connector. The markings may include, for example, boundary boxes or other boundaries encapsulating specific portions of visual multimedia content illustrating hazards, 3D segmentations that cover the entire 3D area around the issue, and the like.

In an embodiment, the hazard identifier 120 is configured to utilize machine learning techniques in order to identify hazardous site conditions in an enhanced floor plan based on hazardous site conditions indicated in annotations of training enhanced floor plans. In an example implementation, features extracted from the enhanced floor plans and associated identifications of issues (i.e., as indicated in the annotations) may be utilized as inputs to a supervised learning process in order to generate a model for predicting whether each portion of visual multimedia content element indicates a hazardous site condition, which hazardous site conditions is indicated in each portion of the visual multimedia content, a severity of each hazardous site condition, a likelihood that injury will occur due to each hazardous site condition, a combination thereof, and the like.

To this end, in an embodiment, the hazard identifier 120 is configured to extract, from training enhanced floor plans, features and labels to be utilized for training a classifier. In some implementations, only features and labels associated with points on the training enhanced floor plans indicated as hazardous (e.g., as indicated in the annotations) may be extracted.

In an embodiment, the features include visual features, environmental features, or both. The visual features may include, but are not limited to, 3D objects, transformations of 2D pixels, transformations of 2D objects, a combination thereof, and the like. The environmental features may include, but are not limited to, dimensions, locations, values of sensor signals, combinations thereof, and the like. The environmental features may include spatial data, location data, sensor data, and the like. In a further embodiment, only objects and pixels related to hazardous site conditions (e.g., objects and pixels shown in visual multimedia content associated with annotations indicating hazardous site conditions) may be used for the extraction to improve efficiency and accuracy of training the classifier.

In a further embodiment, extracting the features may further include extracting 3D objects from a 3D site model of each training enhanced floor plan. To this end, any 2D content of the visual multimedia content may be matched to a corresponding portion of the 3D site model of the enhanced floor plan. Thus, any matched portions of the enhanced floor plan may include the entire (2D and 3D) visual data in addition to text, sounds, volatile organic compounds (VOC) data, dust particle data, and other sensor data, may be categorized as site conditions, and the features of each site condition may be grouped accordingly. Matching the 2D visual multimedia content to the 3D site model further allows for more accurate classification by providing information related to three dimensional aspects of site conditions.

In an embodiment, extracting the labels from the annotations include extracting markings, and may further include extracting key text. Thus, the labels demonstrate, for example, whether portions of the visual multimedia content element show hazardous site conditions, types of hazardous site conditions shown, or both. Each extracted label corresponds to a subset of the extracted features, for example with respect to a point on a 3D site model. The extracted markings demonstrate portions of the visual multimedia content element showing a site condition determined to be hazardous.

The extracted key text may include, for example, indicators of hazard or non-hazard status, code numbers, violation names, site conditions, semantics, and the like. In a further embodiment, extracting the labels may include pre-processing voice data by, for example, translating the voice data into text using a natural language processor (not shown). The key text may be predetermined words or phrases, words or phrases learned through a machine learning algorithm, and the like.

The features and labels extracted from the training enhanced floor plans are input to a machine learning algorithm to train a classifier to classify subsets of the features and labels with respect to whether a site condition is hazardous, a type of defect or hazard presented by a site condition, or both (e.g., by classifying into types of hazardous site conditions including a "no hazard" type). The subsets may include features extracted from portions of the enhanced floor plans associated from the same point (e.g., images and annotations of a specific location within the site).

Alternatively or collectively, the classifier may be trained to classify site conditions based on likelihood of accident, severity of hazard, or both. In such an embodiment, the training enhanced floor plans include annotations indicating likelihood of accidents, severity of hazard, or both, respectively, thereby allowing for learning site conditions that are more severe (i.e., more dangerous) or otherwise increase the likelihood of an accident occurring on site.

In an embodiment, the hazard identifier 120 is configured to input features extracted from subsequent enhanced floor plans to the classifier such that the classifier outputs a classification of a site condition of each subset of the extracted features. Based on the output classifications, the hazard identifier 120 is configured to identify one or more hazardous site conditions in the enhanced floor plan. In a further embodiment, the hazard identifier 120 may be configured to send, to the user device 130, a notification indicating the identified hazardous site conditions. The notification may further indicate, for example, the location of each hazardous site condition in the site, a code or other standard associated with the identified hazardous site condition, and the like.

It should be noted that the embodiments described herein above with respect to FIG. 1 are described with respect to one user device 130 merely for simplicity purposes and without limitation on the disclosed embodiments. Multiple user devices may be equally utilized without departing from the scope of the disclosure, thereby allowing for creating notifying different users of potentially hazardous site conditions identified in respective enhanced floor plans.

Figure 2:
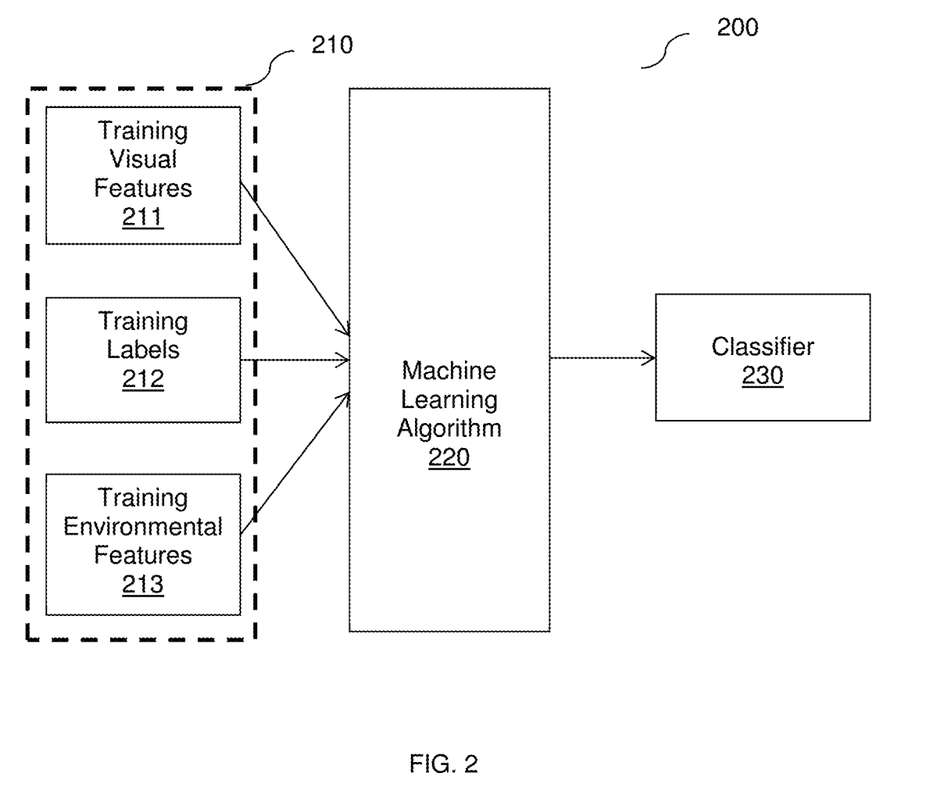
FIG. 2 is a flow diagram illustrating a training phase for training a hazardous site condition identification model according to an embodiment.

FIG. 2 is a flow diagram 200 illustrating a training phase according to an embodiment. A training set 210 is fed to a machine learning algorithm 220 to generate a classifier 230. The training set 210 includes sequences of training inputs. The sequences of training inputs include training labels 212 as well as training features such as training visual features 211, training environmental features 213, or both.

The training labels 212 include indications of whether corresponding subsets of the training visual features 211 are hazardous, a type of hazardous site condition, a severity of each hazardous site condition, a likelihood of accident due to the hazardous site condition, and the like. To this end, the training labels 212 may include, but are not limited to, markings on visual multimedia content, key text, or both.

The training visual features 211 include features extracted from the enhanced floor plan such as transformations of 2D pixels and objects, 3D objects, dimensions, ambient environmental conditions, and locations. The training environmental features 213 indicate environment characteristics of the site such as, but are not limited to, noise level, volatile organic compound (VOC) level, temperature, humidity, smoke, and dust particles. The training environmental features 213 may be, for example, captured by sensors deployed at the site.

The machine learning algorithm 220 is configured to output the classifier 230. The classifier 230 classifies subsets of the training set 210. To this end, the classifier 230 may be a binary classifier that classifies each subset of the training set 210 into either hazardous or not hazardous. In some implementations, the classifier 230 may be a non-binary classifier that classifies each subset of the training set 210 into a specific type of hazardous site condition (e.g., a violation of a particular code or standard practice), a degree of severity (e.g., high, medium, or low), or a likelihood of accident (e.g., high, medium, low).

Figure 3:
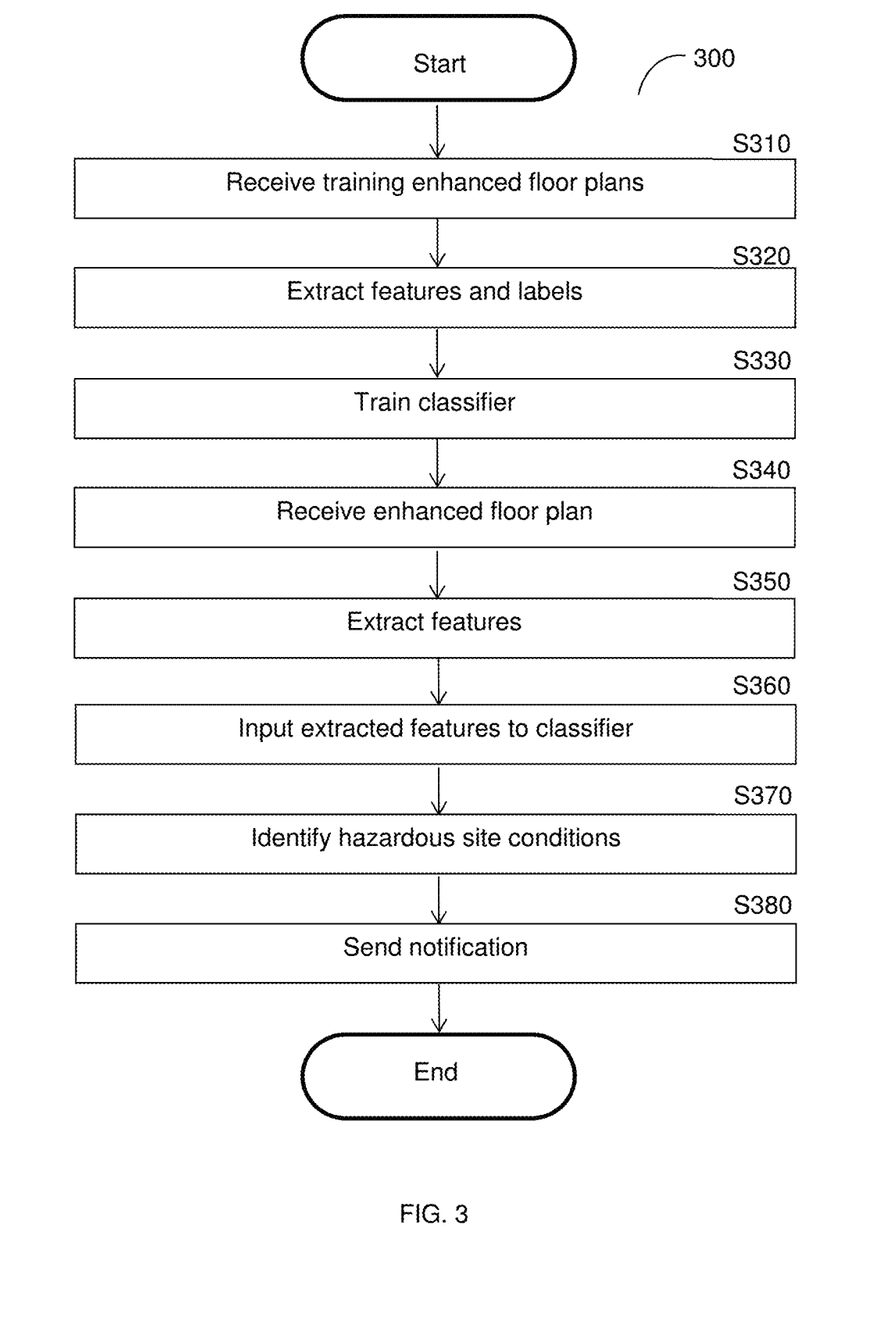
FIG. 3 is a flowchart illustrating a method for identifying hazardous site conditions according to an embodiment.

FIG. 3 is a flowchart 300 illustrating a method for identifying hazardous site conditions using machine learning based on an enhanced floor plan according to an embodiment. In an embodiment, the method is performed by the hazard identifier 120, FIG. 1.

At S310, training enhanced floor plans are received. The training enhanced floor plans may be created, for example, as described herein below with respect to FIG. 5. Each training enhanced floor plan includes visual multimedia content, environmental data, or both. Each training enhanced floor plan also includes annotations associated with the respective visual multimedia content, environmental data, or both.

The visual multimedia content shows different locations on a site (e.g., locations associated with points on an enhanced floor plan). The environmental data indicates information related to the environment of the site such as, but not limited to, dimensions (i.e., data indicating distances in the visual multimedia content), locations (e.g., locations of points with respect to the rest of the floor plan), heat, humidity, smoke.

The annotations in each training enhanced floor plan may include markings on visual multimedia content (e.g., a bounding box, cubes, or circle drawn around a portion of visual multimedia content), text, voice content, pointers to other locations (e.g., links to regulatory codes or other external documents indicating potential violations), and the like.

The visual multimedia content element markings may indicate specific portions of visual multimedia content that demonstrate the hazardous site condition. For example, when the hazardous site condition is a missing guardrail, the markings may include drawing a boundary box where a guardrail should be. The markings may assist in more accurate identification of hazardous site conditions by allowing for more specific visual features to be provided to the classifier.

The text or voice content may be provided via inputs by a user (e.g., a site inspector), and may indicate, for example, whether a point on the enhanced floor plan demonstrates a hazardous or non-hazardous site condition, a type of violation (e.g., a code or standard that has been violated), the specific hazardous condition (e.g., an object or set of circumstances that result in a violation), a combination thereof, and the like.

At S320, features and corresponding labels are extracted from the training enhanced floor plans. The features include visual features, environmental features, or both, as described herein above. The labels include visual indicators (e.g., markings) of hazards, text, voice data, pointers, or a combination thereof. The features and corresponding labels may be grouped, for example, with respect to respective portions of the enhanced floor plan (e.g., points on the enhanced floor plan). Each grouping of features and labels is a subset of the features and labels characterized as a site condition.

In an embodiment, extracting the features, labels, or both, may include pre-processing portions of the enhanced floor plan from which features and labels are to be extracted. For extraction of visual features, the pre-processing may include matching 2D visual multimedia content to a 3D site model. This allows for including 3D objects associated with hazardous site conditions among the features for each site condition. For extraction of text labels, the pre-processing may include converting voice data to text, cleaning text data, or both. The cleaning may include, for example, modifying identified code numbers to match a predetermined format, correcting typos (e.g., replacing "$" in a code number with "4"), or both.

At S330, the extracted features and labels are input to a machine learning algorithm to train a classifier. The trained classifier may be configured to classify site conditions into, for example, hazardous or non-hazardous, a particular type of hazardous site condition, a severity, a likelihood of accident, or a combination thereof. In some embodiments, multiple classifiers may be trained. For example, a first classifier may be trained to classify whether a site condition is hazardous or not, and a second classifier may be trained to classify the site condition into a specific type of hazardous site condition. In a further embodiment, site conditions may be analyzed by the first classifier, and only site conditions classified as hazardous are analyzed by the second classifier. This increases efficiency of classification by reducing number of sets of features needed to be classified with respect to each potential classification (e.g., whether hazardous or not, type of hazard, severity, and likelihood) when, for example, only a small proportion of site conditions are hazardous.

It should be noted that, in some implementations, additional features and labels may be input to the machine learning algorithm to update or otherwise retrain the classifier. This allows for updating classifications based on, for example, new visual identifiers of violations, new regulations, and the like.

At S340, when the classifier is trained, an enhanced floor plan for which hazardous site conditions are to be identified is received. The received enhanced floor plan includes visual multimedia content, include environmental data, or both. The received enhanced floor plan does not need to include annotations. Rather, annotations may be provided by a site inspector based on a notification indicating hazardous site conditions identified through using the classifier.

At S350, features are extracted from the enhanced floor plan. The features may be extracted as described herein above with respect to S320.

At S360, the extracted features are input to the classifier and the classifier outputs one or more classifications.

At S370, based on the output classifications, one or more hazardous site conditions are identified. In an embodiment, S370 may further include providing, but is not limited to, locations of the hazardous site conditions, types of hazardous site conditions identified, regulatory requirements violated, severity, likelihood of accident, a combination thereof, and the like. The identification is based on the point on the enhanced floor plan associated with each site condition classified as hazardous or a particular type of hazardous site condition.

At S380, a notification indicating the identified hazardous site conditions is generated and sent to, for example, a user device of a site inspector. In some implementations, S380 may include adding annotations to the enhanced floor plan based on the identified hazardous site conditions. In another implementation, the identified hazardous site conditions may be shown on a dashboard (e.g., to a site inspector) and, and a notification may be sent only if the identified hazardous site condition is confirmed as hazardous. The notification may include the enhanced floor plan with added annotations or a link thereto. In some implementations, the notification may also include electronic documents related to the regulations or other standards that are violated by each identified hazardous site condition, or links thereto.

As a non-limiting example, an enhanced floor plan is generated based on data collected on a jobsite. An image of the enhanced floor plan shows a worker that is not properly secured in a harness while suspended more than 6 feet off of the ground. The site inspector or risk engineer flags (annotates) the worker shown in the image as a hazardous site condition by drawing a boundary box around the worker and associates the annotation with a particular OSHA or other safety guideline violation via standard semantics and text included as metadata for the image. Visual features are extracted from the image and labels are extracted from the annotations for the image.

The extracted features and labels are input, along with other visual features and respective labels of visual and non-visual multimedia content of the same and different enhanced floor plans, to a machine learning algorithm to train a classifier. When a subsequently received enhanced floor plan to be analyzed for hazardous site conditions is received, visual features are extracted from images or videos from the subsequently received enhanced floor plan and input to the classifier. If the subsequently received enhanced floor plan includes an image of a worker that is not secured in a harness while suspended more than 6 feet, the classifier may classify the site condition shown in the image as failure to secure worker in violation of a specific OSHA regulation.

Figure 4:
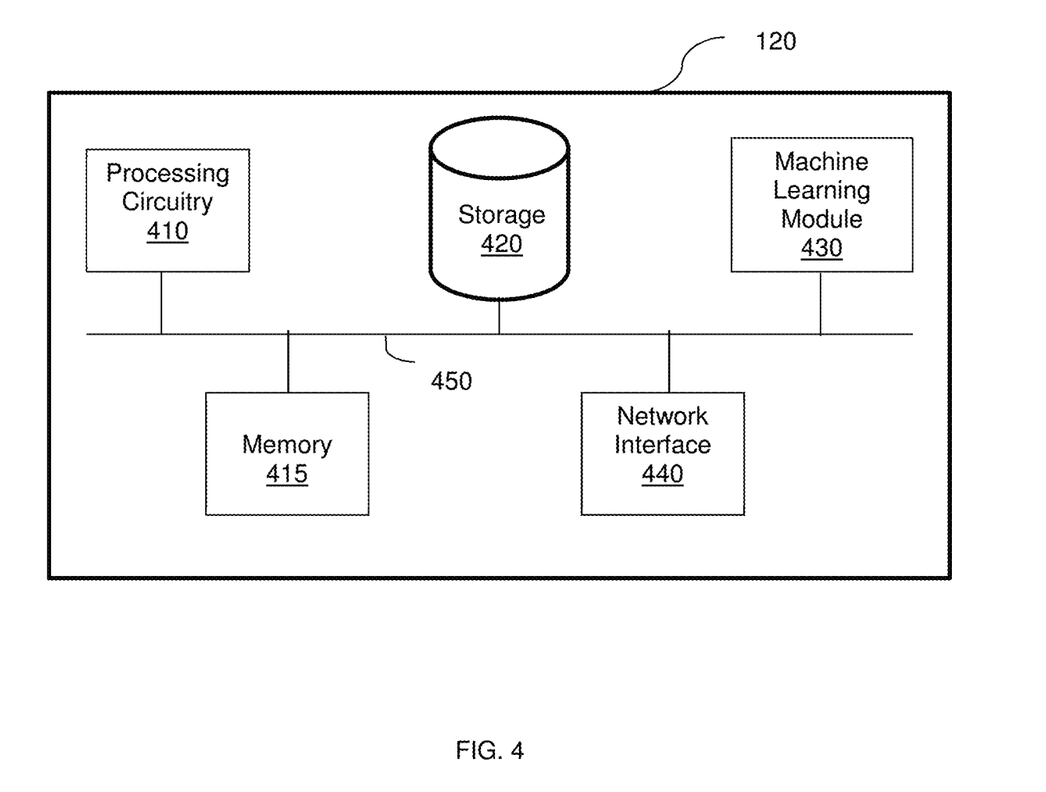
FIG. 4 is a schematic diagram of a hazard identifier according to an embodiment.

FIG. 4 is an example schematic diagram of the hazard identifier 120 according to an embodiment. The hazard identifier 120 includes a processing circuitry 410 coupled to a memory 415, a storage 420, a network interface 430, and a machine learning module 440. In another embodiment, the components of the hazard identifier 120 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform the embodiments described herein.

The storage 420 may be magnetic storage, optical storage, and the like, and may be realized, for example, as flash memory or other memory technology, CD-ROM, Digital Versatile Disks (DVDs), or any other medium which can be used to store the desired information.

The network interface 430 allows the hazard identifier 120 to communicate with the user device 130, the database 140, the data sources 150, or a combination of, for the purpose of, for example, retrieving enhanced floor plans, retrieving regulatory requirements and other safety standards, sending notifications of identified hazards, and the like.

The machine learning module 440 is configured to train a classifier to be utilized for classifying potential hazardous site conditions. The inputs utilized to train the classifiers include visual features and annotation features, and may further include environmental features.

It should be understood that the embodiments described herein are not limited to the specific architecture illustrated in FIG. 4, and other architectures may be equally used without departing from the scope of the disclosed embodiments.

Figure 5:
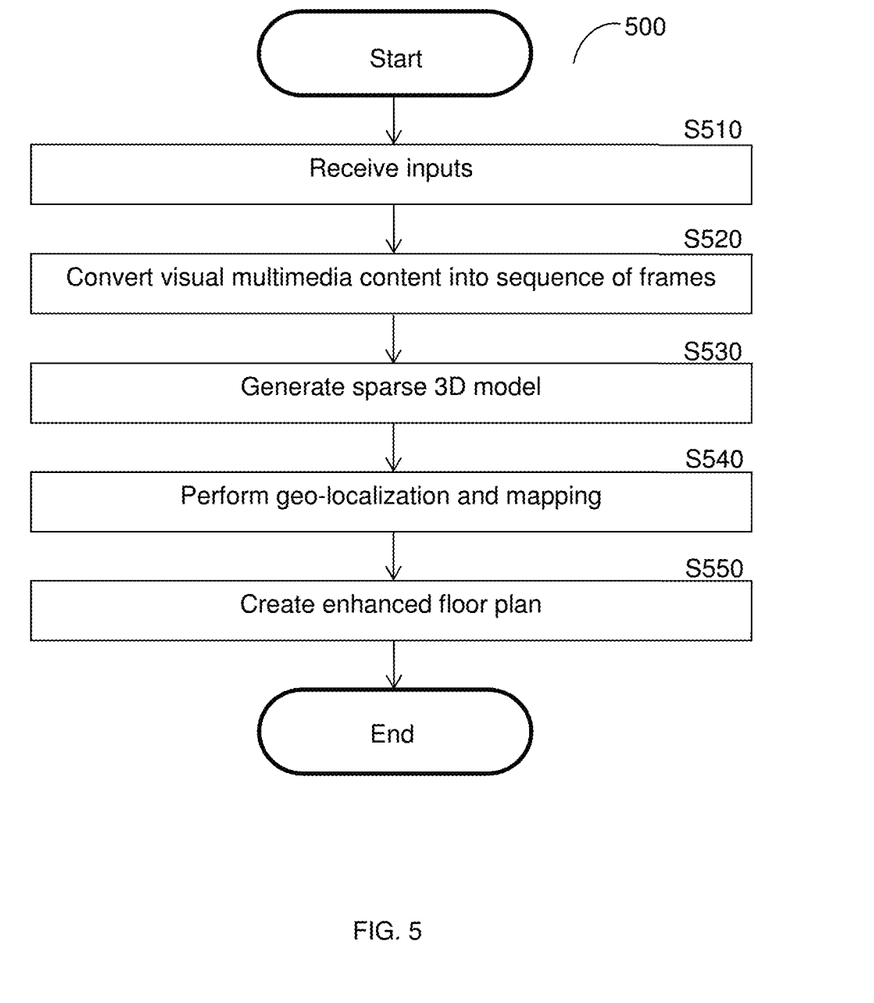
FIG. 5 is a flowchart illustrating a method for creating an enhanced floor plan according to an embodiment.

FIG. 5 is an example flowchart 500 illustrating a method for creating an enhanced floor plan according to an embodiment. In an embodiment, the method is performed by a floor plan enhancer, for example, the floor plan enhancer described further in U.S. patent application Ser. No. 16/220,709, the contents of which are hereby incorporated by reference.

At S510, visual multimedia content showing a site is received. The visual multimedia content may be 2D or 3D, and may include, but is not limited to, images, video, or both. When the visual multimedia content includes 2D images, 3D characteristic data such as LIDAR measurements may also be received. In some implementations, S510 may further include receiving an input floor plan or a floor identifier that may be utilized to retrieve a floor plan associated with the floor identifier.

At S520, the received visual multimedia content is converted into a sequence of frames. Each frame is a 2D image. When the visual multimedia content includes 3D content, two or more frames may be generated for each 3D image or each of at least one portion of a 3D video. The two or more frames generated for 3D content may include 2D images that collectively show the entire view illustrated in the 3D content. When the visual multimedia content includes 3D video, converting the visual multimedia content into a sequence of frames may include identifying portions of the 3D video, then converting each 3D video portion into two or more 2D images.

At S530, based on the sequence of frames, a sparse 3D model of the site is generated. The sparse 3D model is a 3D representation of the site including a point cloud including reference points representing portions of any objects or other visual features illustrated in the visual multimedia content.

In an example implementation, the visual multimedia content includes 2D images, the sparse 3D model may be generated based on a sequence of frames including the 2D images and 3D characteristic data captured by one or more sensors.

At S540, the sparse 3D model is geo-localized with respect to an input 2D or 3D floor plan model. In an embodiment, S540 includes either converting the sparse 3D model to a 2D site model and matching features of the 2D site model to the input 2D floor plan model, or matching features of the sparse 3D model to features of a 3D building information model.

In an example implementation, the feature matching may be based on matching of a distinct set of features that uniquely identify a portion of the site between the 2D site model and the 2D floor plan model. Each feature may be matched with respect to a number of reference points per feature. The features may include, but are not limited to, corners, columns, walls, and the like, depending on various phases of the construction. Based on the matching features, an orientation of the 2D site model relative to the 2D floor plan model is determined. As a non-limiting example, a corner of a building may be a feature having 4 reference points. Matching the corner as shown in the 2D model to the corner as shown in the 2D floor plan model allows for determining the orientation of the 2D site model to that of the 2D floor plan model, for example, a 90-degree clockwise rotation of the corner as seen in the 2D site model relative to the corner as shown in the 2D floor plan model indicates that the 2D site model is oriented 90 degrees clockwise from the 2D floor plan model.

At S550, an enhanced floor plan is created. Creating the enhanced floor plan may include superimposing the matched sparse 3D model to the 3D building information model. Alternatively, creating the enhanced floor plan may include superimposing the mapped 2D site model to the 2D floor plan model. To this end, S550 may further include generating a graphical user interface (GUI) including the enhanced floor plan. One or more points on the enhanced floor plan may be associated with corresponding portions of the visual multimedia content that were, for example, captured at the respective points. Interacting with the GUI may allow, for example, adding comments and annotations, viewing portions of the visual multimedia content, viewing historical data of the enhanced floor plan ("time travel"), and the like.

Figure 6A:
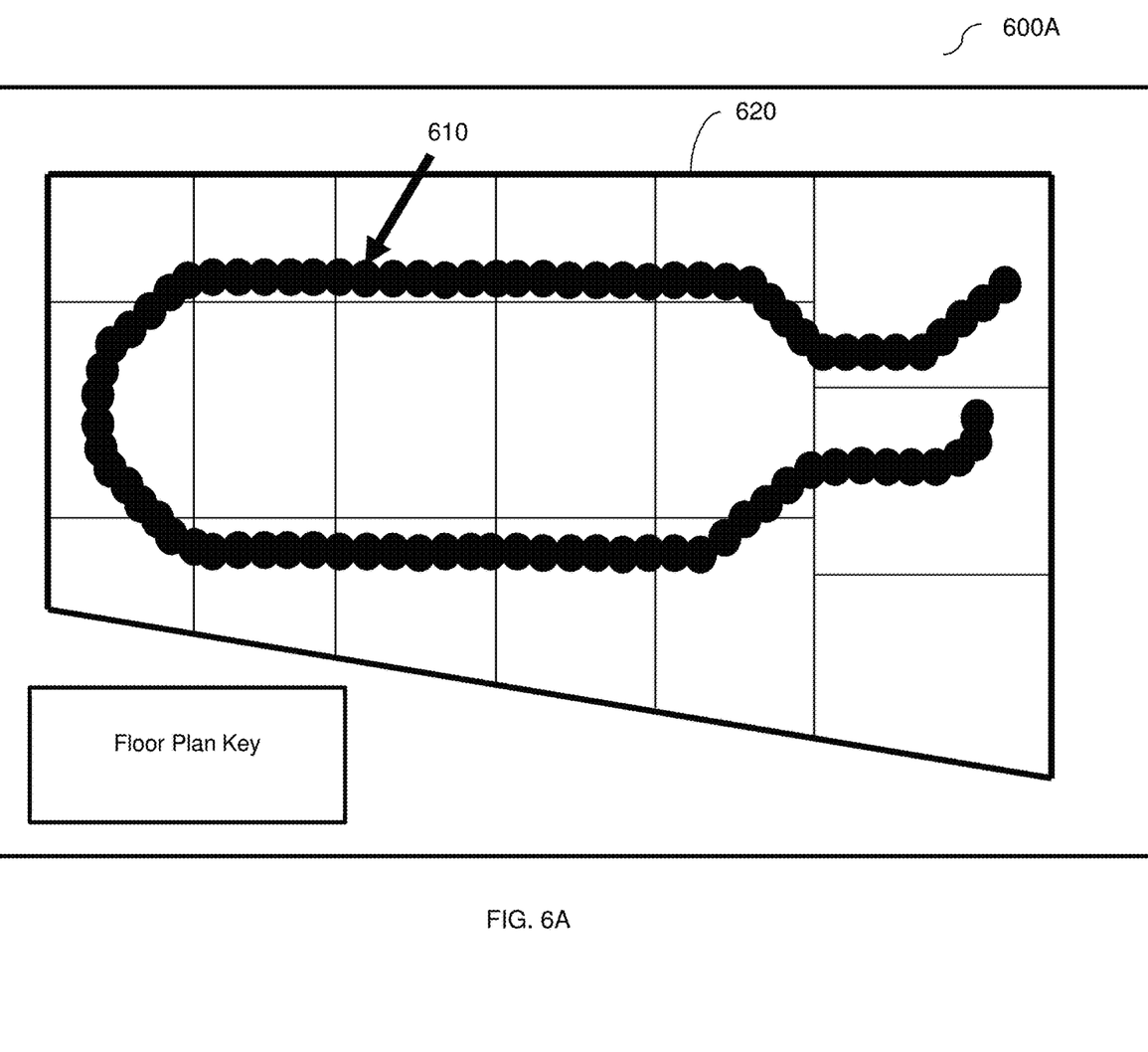
FIGS. 6A-6C are screenshots illustrating views of a graphical user interface with respect to an enhanced floor plan.
Figure 6B:
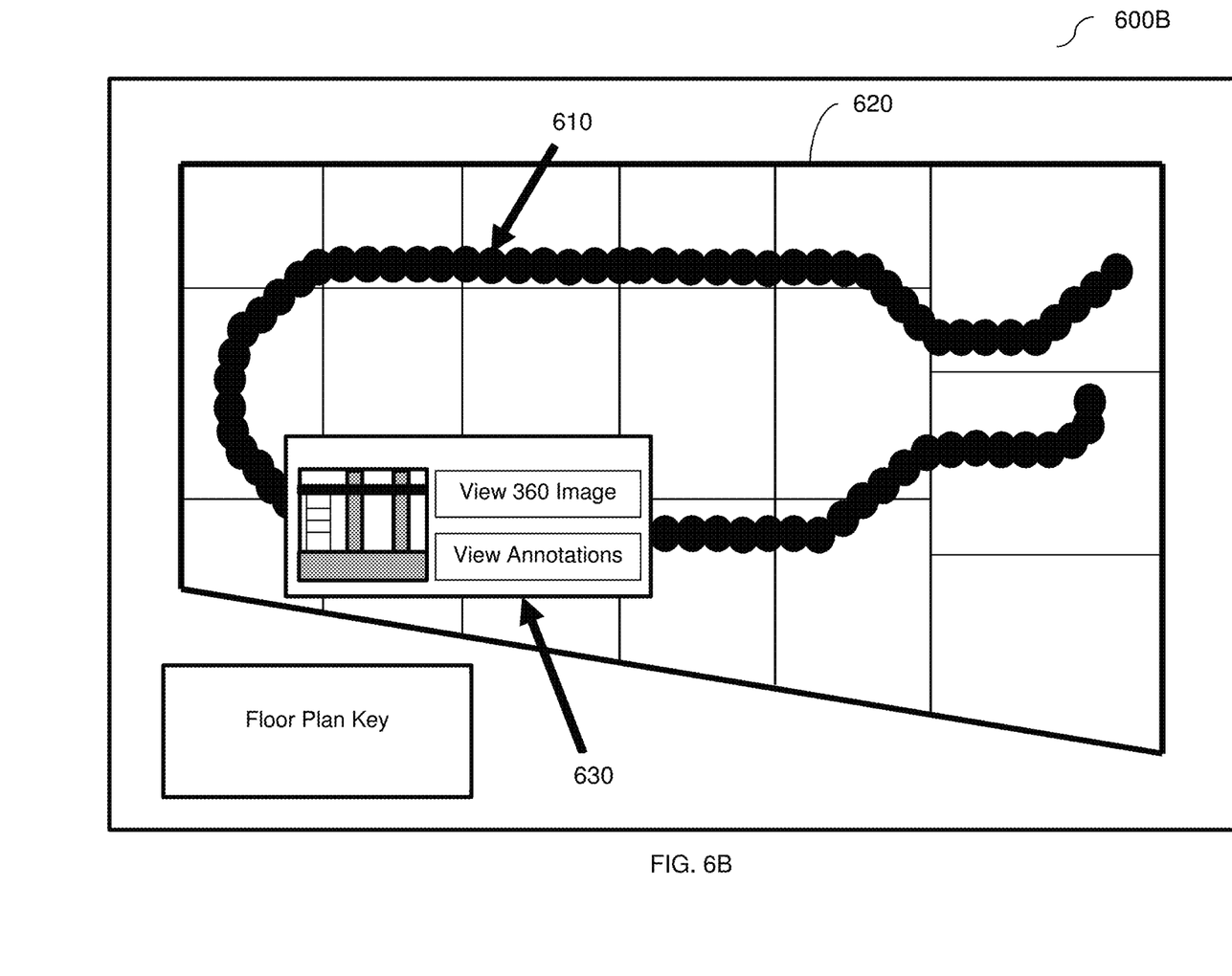
Figure 6C:
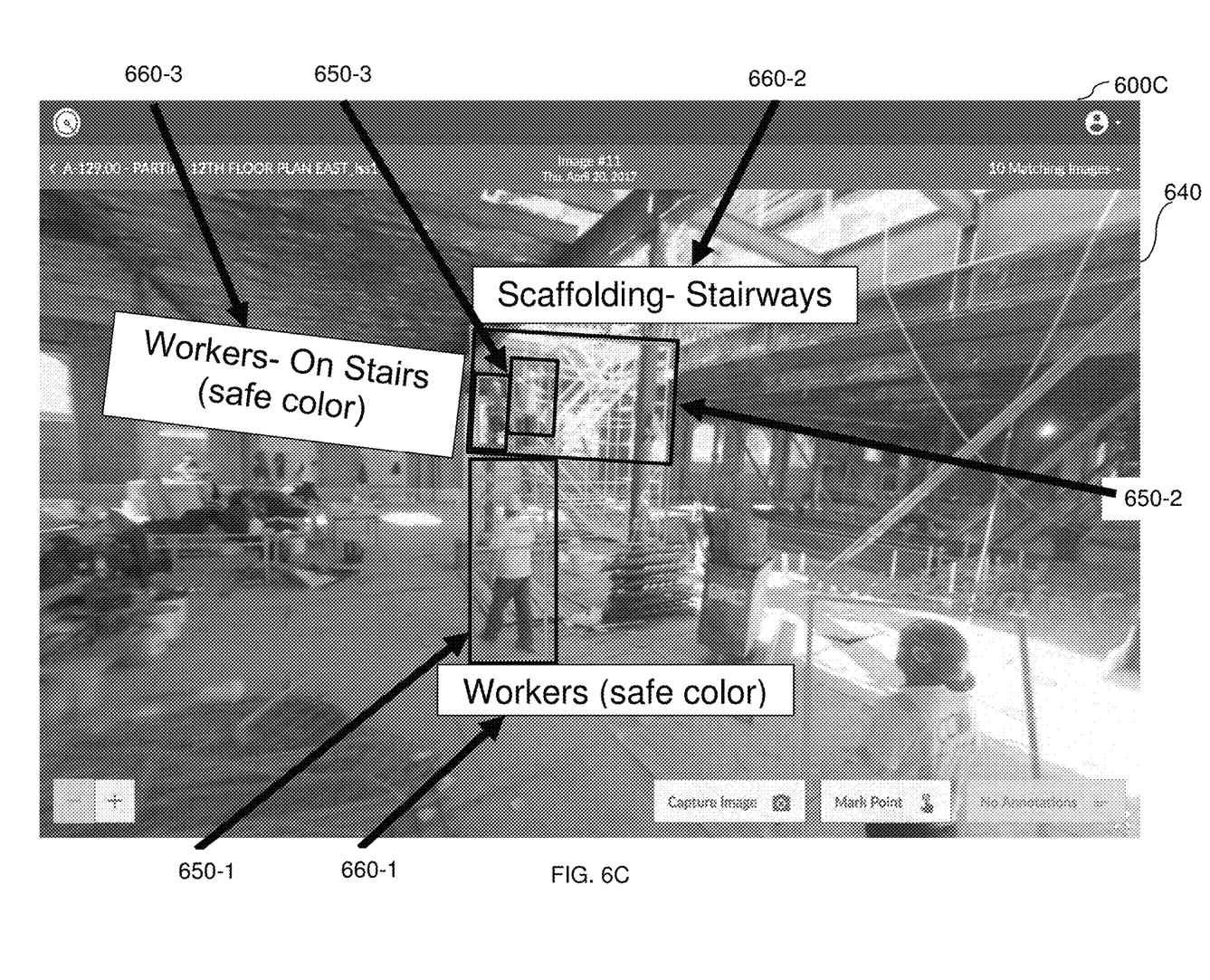

FIGS. 6A-6C are example screenshots 600A, 600B, and 600C, respectively, of graphical user interfaces illustrating an example enhanced floor plan according to an embodiment. In the example screenshot 600A, a walkthrough path 610 is superimposed on a 2D floor plan model 620. The walkthrough path 610 includes a set of points that collectively demonstrate a route taken during a walkthrough of a floor shown in the 2D floor plan model.

In the example screenshot 600B, an image icon 630 has been superimposed on the walkthrough path 610 and the 2D floor plan model 620. The image icon 630 is associated with one of the points of the walkthrough path 610, and may be superimposed in response to selection of the associated point (e.g., by a user clicking on the point via a graphical user interface including the walkthrough path 610 superimposed on the 2D floor plan model 620).

In the example screenshot 600C, an image 640 of a site is displayed, for example in response to an interaction with one of the points on the walkthrough path 610. The image 640 includes annotations such as boundary boxes 650-1 through 650-3 and corresponding textual annotations 660-1 through 660-3. The boundary boxes 650-1 through 650-3 surround objects in the image 640 that may be potential hazards, and each respective textual annotation 660-1 through 660-3 provides a textual description of, for example, whether the object demonstrates a hazard, a type of hazard, a severity of the hazard, a likelihood of injury for the hazard, a combination thereof, and the like. In some implementations (not shown), the boundary boxes 650, the textual annotations 660, or both, may be depicted in different colors based on, for example, the severity or likelihood of injury of a hazard.

The graphical user interface may be interacted with in order to select portions of the enhanced floor plan and to input annotations for the selected portions. In some implementations, the image icon 630 may also be interacted with in order to, for example, cause display of a corresponding image, view annotations associated with the corresponding image, view historical images showing the same or similar point on the walkthrough path 610, and the like. The same or similar point may be, for example, a point captured from the same position or approximately the same position (e.g., within a predetermined threshold distance).

It should be noted that the method for creating enhanced floor plans is described with respect to creating an enhanced floor plan for a site based on visual content captured during a walkthrough merely for simplicity purposes and without limitation on the disclosed embodiments. In an example implementation, the site is a construction site. The site may be any location or portion thereof such as, but not limited to, a floor of a building under construction, a room of a building under construction, an outdoor location in which structures are erected (e.g., a location of a street fair in which tents and amusement rides are constructed, a location of a park including statues and playground equipment, etc.), a highway or other portion of road, virtual versions thereof (e.g., a floor of a building to be rendered via virtual reality programs), and the like.

It should be also noted that the method for creating enhanced floor plans is described with respect to 2D floor plan models merely for simplicity purposes and without limitation on the disclosed embodiments. The disclosed embodiments may be equally applicable to other locations, regardless of whether they are typically characterized as a "floor." As a non-limiting example, the disclosed embodiments may be utilized to provide an enhanced map of an outdoor site rather than a floor of a building.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying hazardous site conditions, comprising:
    training a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and
    identifying at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification, wherein the test enhanced floor plan is created based on a sparse 3D model and at least one distinct feature set identified in a site layout model, wherein each distinct feature set defines a feature with respect to a respective arrangement of feature reference points that does not change based on an orientation of the respective matching feature within the sparse 3D model.

2. The method of claim 1, wherein each of the plurality of training enhanced floor plans represents a training site, wherein each of the plurality of training enhanced floor plans includes at least one temporal variation, wherein each temporal variation of each training enhanced floor plan demonstrates a state of the training site represented by the training enhanced floor plan at a different point in time, wherein each temporal variation of an enhanced floor plan includes a plurality of historical versions of respective points of the enhanced floor plan and respective annotations.

3. The method of claim 1, wherein the classifier is a first classifier, further comprising:
    applying a second classifier to a subset of the plurality of test features based on the identified at least one hazardous site condition, wherein the second classifier is trained to classify types of hazardous site conditions, wherein the subset of the plurality of test features is related to the identified at least one hazardous site condition.

4. The method of claim 1, wherein the plurality of training labels is extracted from a plurality of annotations of the plurality of training enhanced floor plans, wherein each of the plurality of annotations is associated with a training hazardous site condition of one of the plurality of training enhanced floor plans.

5. The method of claim 1, wherein each of the at least one site condition classification indicates whether a site condition is hazardous.

6. The method of claim 1, wherein each of the at least one site condition classification indicates a type of hazard.

7. The method of claim 1, wherein each of the at least one hazardous site condition classification indicates a severity of hazard of a site condition.

8. The method of claim 1, wherein the site layout model includes a plurality of floor plan points, wherein the test enhanced floor plan is created by identifying a plurality of matching site layout model features of the site layout model with respect to the sparse 3D model, wherein creating the test enhanced floor plan further includes superimposing the plurality of matching site layout model features of the sparse 3D model to the site layout model.

9. The method of claim 8, wherein each of the site layout model features is a matching distinct feature set of the at least one distinct feature set identified in the site layout model.

10. The method of claim 1, wherein the identified at least one hazardous site condition indicates at least one hazard at a construction site.

11. The method of claim 1, wherein the identified at least one hazardous site condition includes at least one of: a missing guardrail, an unsecured person suspended above the ground, a slippery substance on the ground, and a hazardous substance located within a predetermined distance of another object.

12. A non-transitory computer readable medium having stored thereon instructions for causing a processing circuitry to execute a process, the process comprising:
    training a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and
    identifying at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification, wherein the test enhanced floor plan is created based on a sparse 3D model and at least one distinct feature set identified in a site layout model, wherein each distinct feature set defines a feature with respect to a respective arrangement of feature reference points that does not change based on an orientation of the respective matching feature within the sparse 3D model.

13. A system for identifying hazardous site conditions, comprising:
- a processing circuitry; and
- a memory, the memory containing instructions that, when executed by the processing circuitry, configure the system to:
- train a classifier using a labeled training set, wherein the classifier is trained to classify site conditions based on features extracted from enhanced floor plans, wherein the labeled training set includes a plurality of training features and a plurality of training labels, wherein the plurality of training features are extracted from a plurality of training enhanced floor plans, wherein the plurality of training labels are a plurality of hazardous site condition identification labels; and
- identify at least one hazardous site condition of a test enhanced floor plan by applying the classifier to a plurality of test features extracted from the test enhanced floor plan, wherein the classifier outputs at least one site condition classification when applied to the plurality of test features, wherein the at least one hazardous site condition is identified based on the at least one site condition classification, wherein the test enhanced floor plan is created based on a sparse 3D model and at least one distinct feature set identified in a site layout model, wherein each distinct feature set defines a feature with respect to a respective arrangement of feature reference points that does not change based on an orientation of the respective matching feature within the sparse 3D model.

14. The system of claim 13, wherein each of the plurality of training enhanced floor plans represents a training site, wherein each of the plurality of training enhanced floor plans includes at least one temporal variation, wherein each temporal variation of each training enhanced floor plan demonstrates a state of the training site represented by the training enhanced floor plan at a different point in time, wherein each temporal variation of an enhanced floor plan includes a plurality of historical versions of respective points of the enhanced floor plan and respective annotations.

15. The system of claim 13, wherein the classifier is a first classifier, wherein the system is further configured to:
- apply a second classifier to a subset of the plurality of test features based on the identified at least one hazardous site condition, wherein the second classifier is trained to classify types of hazardous site conditions, wherein the subset of the plurality of test features is related to the identified at least one hazardous site condition.

16. The system of claim 13, wherein the plurality of training labels is extracted from a plurality of annotations of the plurality of training enhanced floor plans, wherein each of the plurality of annotations is associated with a training hazardous site condition of one of the plurality of training enhanced floor plans.

17. The system of claim 13, wherein each of the at least one site condition classification indicates whether a site condition is hazardous.

18. The system of claim 13, wherein each of the at least one site condition classification indicates a type of hazard.

19. The system of claim 13, wherein each of the at least one hazardous site condition classification indicates a severity of hazard of a site condition.

20. The system of claim 13, wherein the test enhanced floor plan is created based on a sparse three-dimensional (3D) model and a site layout model, wherein the site layout model includes a plurality of floor plan points, wherein the test enhanced floor plan is created by identifying a plurality of matching site layout model features of the site layout model with respect to the sparse 3D model, wherein creating the test enhanced floor plan further includes superimposing the plurality of matching site layout model features of the sparse 3D model to the site layout model.

21. The system of claim 20, wherein each of the site layout model features is a matching distinct feature set of the at least one distinct feature set identified in the site layout model.

22. A method for identifying hazardous site conditions, comprising:
- identifying at least one hazardous site condition of a test enhanced floor plan by applying a classifier to a plurality of test features extracted from the test enhanced floor plan, wherein the classifier is trained to classify site conditions using a labeled training set, wherein a labeled training set includes a plurality of training features and a plurality of training labels, wherein the plurality of training features are extracted from a plurality of training enhanced floor plans, wherein the plurality of training labels are a plurality of hazardous site condition identification labels, wherein the classifier outputs at least one site condition classification when applied to the plurality of test features, wherein the at least one hazardous site condition is identified based on the at least one site condition classification, wherein the test enhanced floor plan is created based on a sparse 3D model and at least one distinct feature set identified in a site layout model, wherein each distinct feature set defines a feature with respect to a respective arrangement of feature reference points that does not change based on an orientation of the respective matching feature within the sparse 3D model.

* * * * *